Nov. 7, 1972   E. V. KRUTIS   3,702,196
STEER AXLE WITH LONGITUDINAL ADJUSTMENT
Filed May 6, 1971   2 Sheets-Sheet 1

Inventor
Edward V. Krutis
By Charles E. Schurr
Attorney

Nov. 7, 1972  E. V. KRUTIS  3,702,196
STEER AXLE WITH LONGITUDINAL ADJUSTMENT
Filed May 6, 1971  2 Sheets-Sheet 2
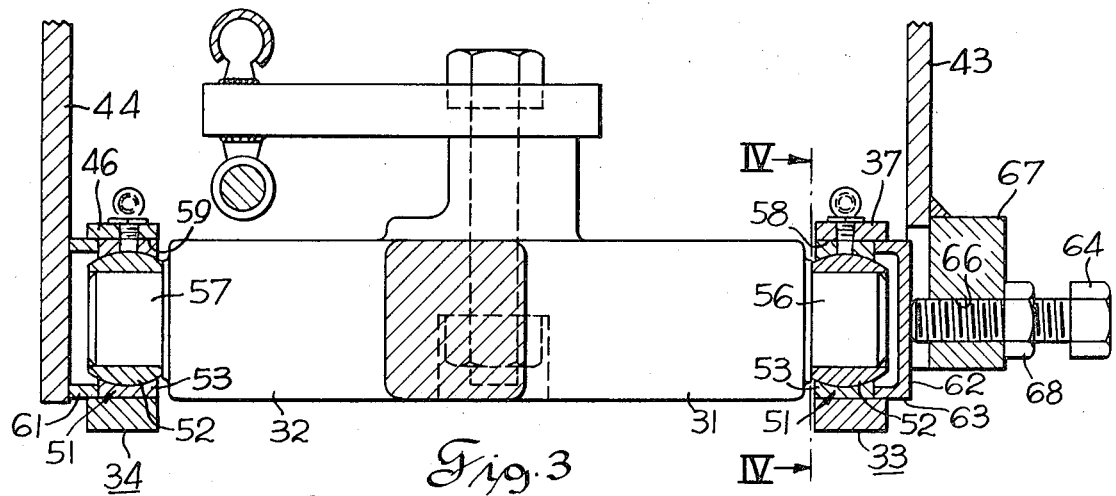
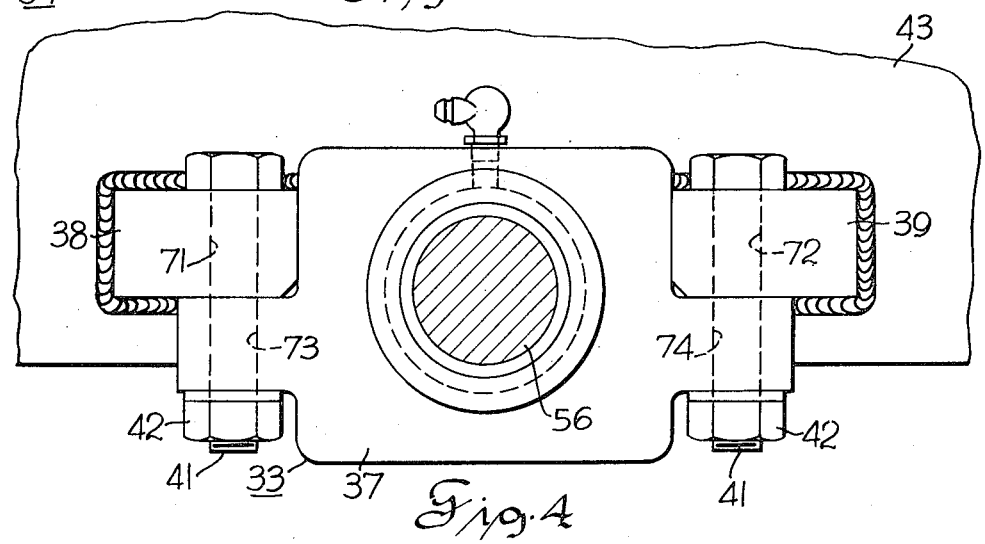
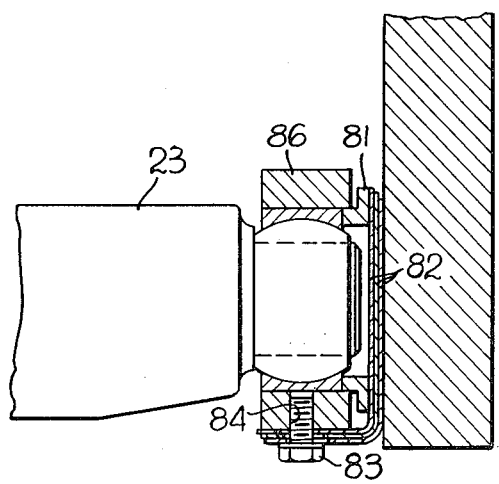

United States Patent Office 3,702,196
Patented Nov. 7, 1972

3,702,196
STEER AXLE WITH LONGITUDINAL
ADJUSTMENT
Edward V. Krutis, Monee, Ill., assignor to Allis-Chalmers
Manufacturing Company, Milwaukee, Wis.
Filed May 6, 1971, Ser. No. 140,699
Int. Cl. B60g 25/00; B62d 37/00
U.S. Cl. 280—111                                6 Claims

ABSTRACT OF THE DISCLOSURE

A pair of longitudinally spaced bearings mount the steer axle of an industrial truck for oscillation about a longitudinal axis. One of the bearings is longitudinally adjusted by a single screw acting against an end cap on the outer end of the one bearing. The cap also serves to seal the outer end of the one bearing against egress of lubricant and ingress of foreign material.

---

The present invention relates to improved means for longitudinally adjusting a pair of bearings which mount a steer axle on the frame of an industrial truck for oscillation about a longitudinal axis. Longitudinal clearances must be limited to prevent slam caused by the high power steering cylinder or drag link forces parallel to the longitudinal axis of the axle, which occur when the operator changes direction of steering or when the tires strike an obstacle. Heretofore longitudinal adjustment of the steer axle of industrial trucks has been achieved by use of shims. The use of shims for adjustment has required stocking appropriate shims for original installation and for spare parts. Also, precise adjustment is not possible, assembly time is high, component parts are costly, and field adjustment is difficult. These problems are substantially obviated by the present invention wherein a single adjusting screw and cap provides quick, precise adjustment of the bearing end play.

BRIEF DESCRIPTION OF THE DRAWINGS

FIG. 3 is a section view taken on the line III—III in FIG. 2; FIG. 4 is a section view taken on the line V—IV in FIG. 3; and FIG. 5 illustrates a prior art arrangement.

DETAILED DESCRIPTION OF THE ILLUSTRATED EMBODIMENT

Figure 1:
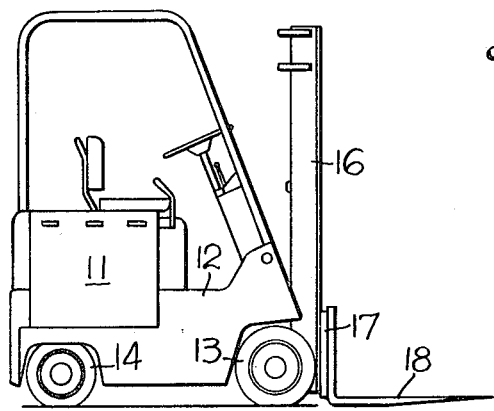
FIG. 1 is a side view of an industrial truck incorporating the present invention.

FIG. 1 shows a self-propelled industrial lift truck 11 having a frame 12 supported at the front end by a pair of drive wheels 13 and at the rear end by a pair of steerable wheels 14. A mast assembly 16 including a load carriage 17 with forks 18 is conventionally supported on the front of the frame 12.

Figure 2:
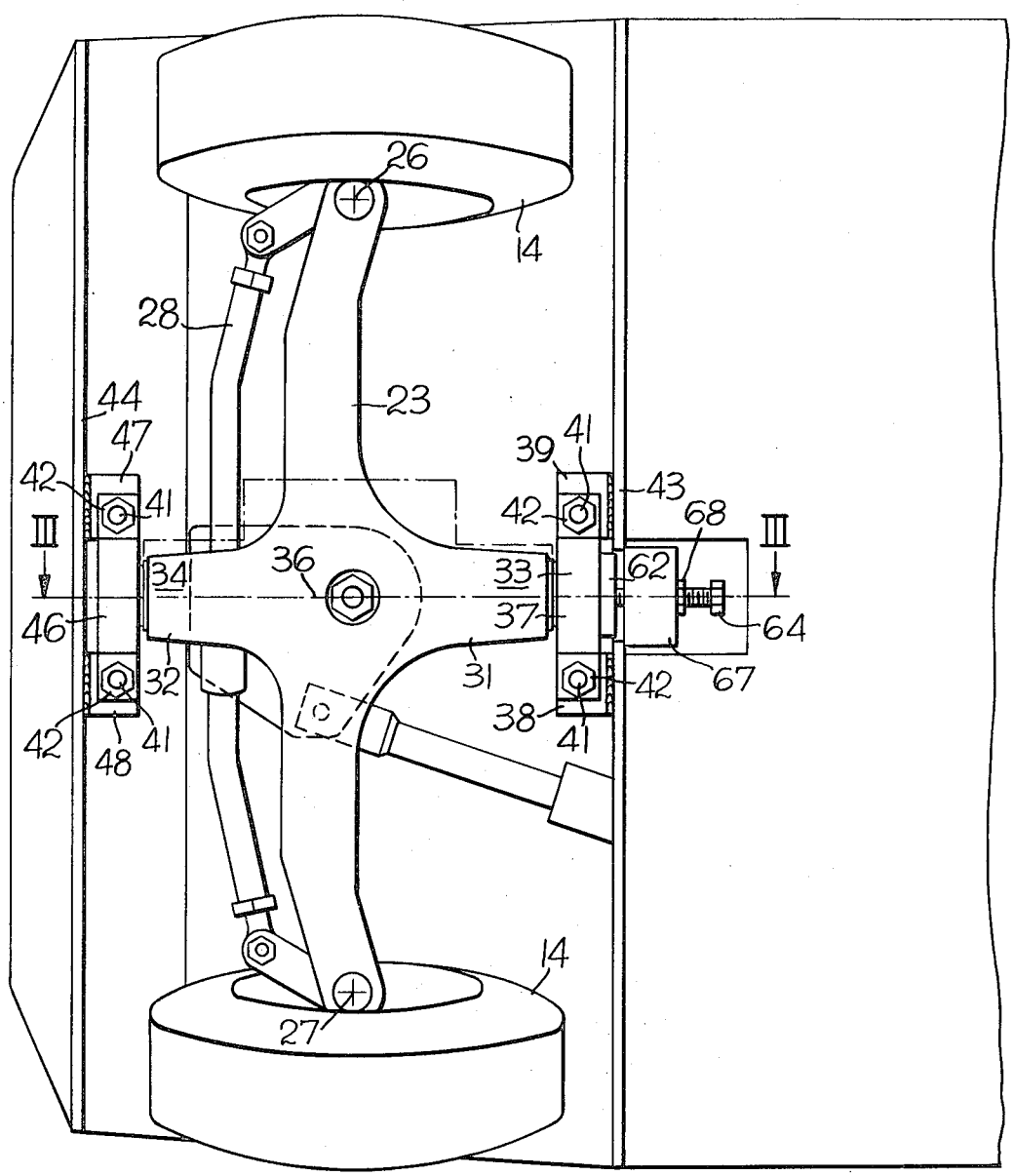
FIG. 2 is a partial bottom view of the truck shown in FIG. 1.

Referring to FIG. 2, the steerable wheels 14 are pivotally mounted on stub axles, not shown, which in turn are pivotally mounted on opposite ends of a transverse axle 23 for steering movement about vertical axes 26, 27 through steering linkage 28. Forward and rearward extending portions 31, 32 of the axle 23 are trunnion-mounted to the frame by a pair of bearing assemblies 33, 34 for oscillating movement about a longitudinal axis 36. As shown in FIGS. 2 and 4, the housing 37 of bearing assembly 33 is releasably secured to a pair of lugs 38, 39 welded to an intermediate transversely extending wall 43 of the frame 12 by bolts 41 and nuts 42. The bolts 41 pass through holes 71, 72 drilled in lugs 38, 39 and through holes 73, 74 drilled in housing 37. In a similar manner, bearing assembly housing 46 is releasably secured to lugs 47, 48 welded to a rear transversely extending wall 44 of the frame 12 by bolts 41 and nuts 42.

Referring to FIG. 3, the bearing assemblies 33, 34, which are preferably identical in construction, each include a self-aligning bearing 51 comprising a radially inner bushing 52 with spherical bearing surface in bearing contact with a mating spherical bearing surface of a radially outer bushing 53. The inner bushings 52 are fitted on trunnion parts 56, 57 of axle portions 31, 32, and the outer bushings 53 are slidingly fitted in cylindrical bores 58, 59 of bearing housings 37, 46. An annular spacer 61 is interposed between the rear transverse wall 44 and bushing 53 to properly position the rear bearing 51 in the housing 46. The proper longitudinal adjustment of the bearings 51 is achieved by the provision of a round cap 62 having a cylindrical outer surface 63 with a sliding fit in bore 58. The cap 62 which is in longitudinal thrust transmitting relation with the outer bushing 53 of bearing 51 in bearing housing 37, is adjusted longitudinally by an adjustable thrust transmitting member in the form of a cap screw 64 having threaded engagement with a drilled and tapped hole 66 in a part 67 of wall 43. Once the longitudinal position of cap 62 is adjusted by the cap screw 64, the latter is locked in place by screwing a jam nut 68 against wall part 67.

The steer axle 23 is installed in the frame 12 of the truck as an assembly complete with bearing assemblies 33, 34, spacer 61 and cap 62. The bolts 41 are installed in the appropriate openings in the bearing housings 37, 46; and lugs 38, 39, 47, 48 and the nuts 42 are threaded loosely thereon. The adjusting screw 64 is installed in threaded opening 66 and screwed inwardly into thrust transmitting relation with cap 62 until a predetermined force is exerted longitudinally against bushing 53 of bearing assembly 33. The force exerted should be sufficient to propertly seat the spacer 61 against the wall 44 and adjacent bushing 53. The spacer 61 fits in bore 59 and cooperates with wall 44 and bushing 33 to prevent entrance of foreign material. The nuts 42 are next tightened on bolts 41 to rigidly secure the bearing housings 37, 46 on the truck frame 12.

The prior art construction shown in FIG. 5 employed a spacer 81 and an appropriate number of shims 82 to reduce longitudinal end play in the bearing mounting for the axle 23. These shims 82 were held in place by a cap screw 83 passing through openings in the shims and threaded into a drilled and tapped opening 84 in bearing housing 86. The use of shims did not permit accurate adjustment to eliminate end play, and the end of the bearing was not effectively sealed against foreign material. The adjustment by shimming is tedious, time consuming and requires excessive stocking of parts as compared with the more accurate and effective adjustment afforded by the present invention.

The embodiments of the invention in which an exclusive property or privilege is claimed are defined as follows:

1. An axle mounting for an industrial truck having a frame, a pair of wheels supporting one end of the frame, a pair of longitudinally spaced walls at the other end of the frame, and a transversely extending axle with wheels at opposite transverse ends, the axle mounting supporting the other end of the frame upon the axle and comprising:

first and second longitudinally spaced bearing housings securely mounted on said walls, respectively, a pair of aligned cylindrical bores in said bearing housings, respectively, a pair of aligned cylindrical trunnion parts on longitudinally opposite ends of said axle, a pair of bearings fitted on said trunnion parts, respectively, and slidingly fitted in said bores, respectively, an end cap in longitudinal thrust transmitting relation to and in sealing engagement with an axially outer end of one of said bearings and disposed at least in part within the one bore in which said one bearing slidingly fits, and an adjustable thrust transmitting member between said cap and the wall on which the bearing housing carrying said one bearing is mounted and operable to adjust said one bearing longitudinally of said frame.

2. The invention of claim 1 wherein said bearings are self-aligning.

3. The invention of claim 2 wherein each of said bearings include a radially inner bushing and a radially outer bushing.

4. The invention of claim 3 wherein each of said inner bushings has a radially outward facing convex bearing surface and each of said outer bushings has a radially inward facing concave bearing surface, said convex bearing surfaces being in thrust transmitting engagement with said concave bearing surfaces, respectively.

5. The invention of claim 4 wherein said cap is in longitudinal thrust transmitting engagement with the axially outer end of the outer bushing of said one bearing.

6. The invention of claim 5 wherein said cap includes a cylindrical surface in sliding engagement with said one bore.

References Cited
UNITED STATES PATENTS

| | | | |
|---|---|---|---|
| 3,059,944 | 10/1962 | Goodacre | 280—95 R |
| 2,732,267 | 1/1956 | Stover | 308—166 X |
| 2,326,180 | 8/1943 | Stempel | 308—166 X |
| 3,448,992 | 6/1969 | Wilfert et al. | 280—112 R |

BENJAMIN HERSH, Primary Examiner

J. A. PEKAR, Assistant Examiner

U.S. Cl. X.R.

308—166